(12) United States Patent
Chern (10) Patent No.: US 7,690,081 B2
(45) Date of Patent: Apr. 6, 2010

(54) HINGE FOR LAPTOP COMPUTER

(76) Inventor: Jr-Jiun Chern, 8F-5, No. 6, Ta Tun 16th Street, Nan Tun District, Taichung (TW)

( * ) Notice: Subject to any disclaimer, the term of this patent is extended or adjusted under 35 U.S.C. 154(b) by 637 days.

(21) Appl. No.: 11/614,421

(22) Filed: Dec. 21, 2006

(65) Prior Publication Data

US 2008/0151476 A1 Jun. 26, 2008

(51) Int. Cl.
*E05C 17/64* (2006.01)
(52) U.S. Cl. ...................................... 16/342
(58) Field of Classification Search .................. 16/342, 16/337, 340, 338, 387–389; 361/679.11, 361/679.12, 679.15, 679.27; 348/373, 333.06, 348/794; 455/550.1, 575.1, 575.3, 575.4
See application file for complete search history.

(56) References Cited

U.S. PATENT DOCUMENTS 5,333,356 A * 8/1994 Katagiri ....................... 16/340
6,085,388 A * 7/2000 Kaneko ....................... 16/338
6,510,588 B2 * 1/2003 Eromaki ...................... 16/308
2005/0034274 A1 * 2/2005 Wu ............................. 16/342
2007/0101543 A1 * 5/2007 Lu et al. ...................... 16/342
2007/0119026 A1 * 5/2007 Lee et al. ..................... 16/342
2007/0192994 A1 * 8/2007 Chuang ....................... 16/342

OTHER PUBLICATIONS

Chinese Patent Publication CN2821654, Sep. 27, 2006, 12 pages.

* cited by examiner

*Primary Examiner*—Chuck Y. Mah
(74) *Attorney, Agent, or Firm*—Alan Kamrath; Kamrath & Associates PA (57) ABSTRACT

A hinge includes a first connector, a lining, a bush and a second connector. The first connector includes a root and a socket extended from the root. The root can be connected to a host of a laptop computer. The lining is fit in the socket so that the lining cannot be rotated in the socket. The bush is fit in the lining so that the bush cannot be rotated in the lining. The second connector includes a shaft and a plate extended from the shaft. The shaft is rotationally inserted in the bush. The plate can be connected to a liquid crystal display of the laptop computer.

11 Claims, 8 Drawing Sheets

HINGE FOR LAPTOP COMPUTER

BACKGROUND OF INVENTION

1. Field of Invention

The present invention relates to a hinge and, more particularly, to a hinge for use in a laptop computer.

2. Related Prior Art

Chinese Patent Publication CN2821654 discloses a hinge for a laptop computer. The hinge includes a base 21, an arched strip 23 mounted on the base 21 and a shaft 22 wrapped by the arched strip 23. The arched strip 23 includes an edge secured to the base 21 and another edge separated from the base 21. The base 21 is secured to a host 10 of the laptop computer. The shaft 22 is secured to a liquid crystal display ("LCD") 30 of the laptop computer. As the LCD 30 is pivoted from the host 10, the shaft 22 moves the free edge of the arched strip 23 further from the base 21 due to the friction between them. The arched strip 23 becomes less tight around the shaft 22 so that the LCD 30 can easily be pivoted from the host 10. As the LCD 30 is pivoted towards the host 10, the shaft 22 moves the free edge of the arched strip 23 closer to the base 21 due to the friction between them. The arched strip 23 becomes tighter around the shaft 22 so that the LCD 30 cannot easily be pivoted towards the host 10. However, the arched strip 23 may not be tight enough around the shaft 22. This drawback will be worse after some time of use, since the arched strip 23 eventually becomes slack because of fatigue. Moreover, the arched strip 23 is fabricated by traditional means such as by bending and a CNC lathe. Therefore, the hinge cannot be manufactured fast.

The present invention is therefore intended to obviate or at least alleviate the problems encountered in the prior art.

SUMMARY OF INVENTION

According to the present invention, a hinge includes a first connector, a lining, a bush and a second connector. The first connector includes a root and a socket extended from the root. The root can be connected to a host of a laptop computer. The lining is fit in the socket so that the lining cannot be rotated in the socket. The bush is fit in the lining so that the bush cannot be rotated in the lining. The second connector includes a shaft and a plate extended from the shaft. The shaft is rotationally inserted in the bush. The plate can be connected to a liquid crystal display of the laptop computer.

An advantage of the hinge according to the present invention is proper friction between the bush and the shaft.

Another advantage of the hinge according to the present invention is durability since the bush is robust and reinforced by the lining.

Other advantages and features of the present invention will become apparent from the following description referring to the drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
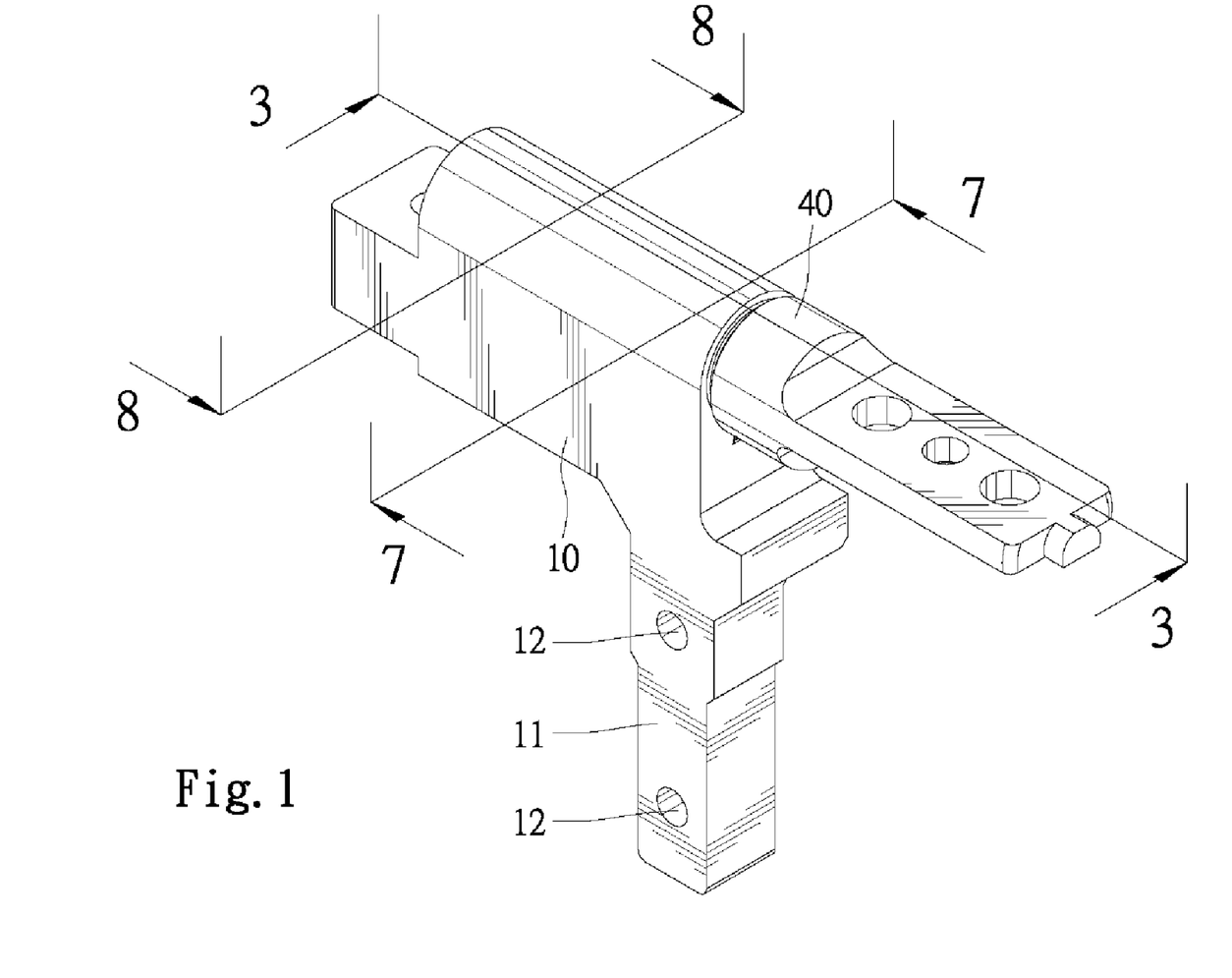
FIG. 1 is a perspective view of a hinge according to the preferred embodiment of the present invention.
Figure 2:
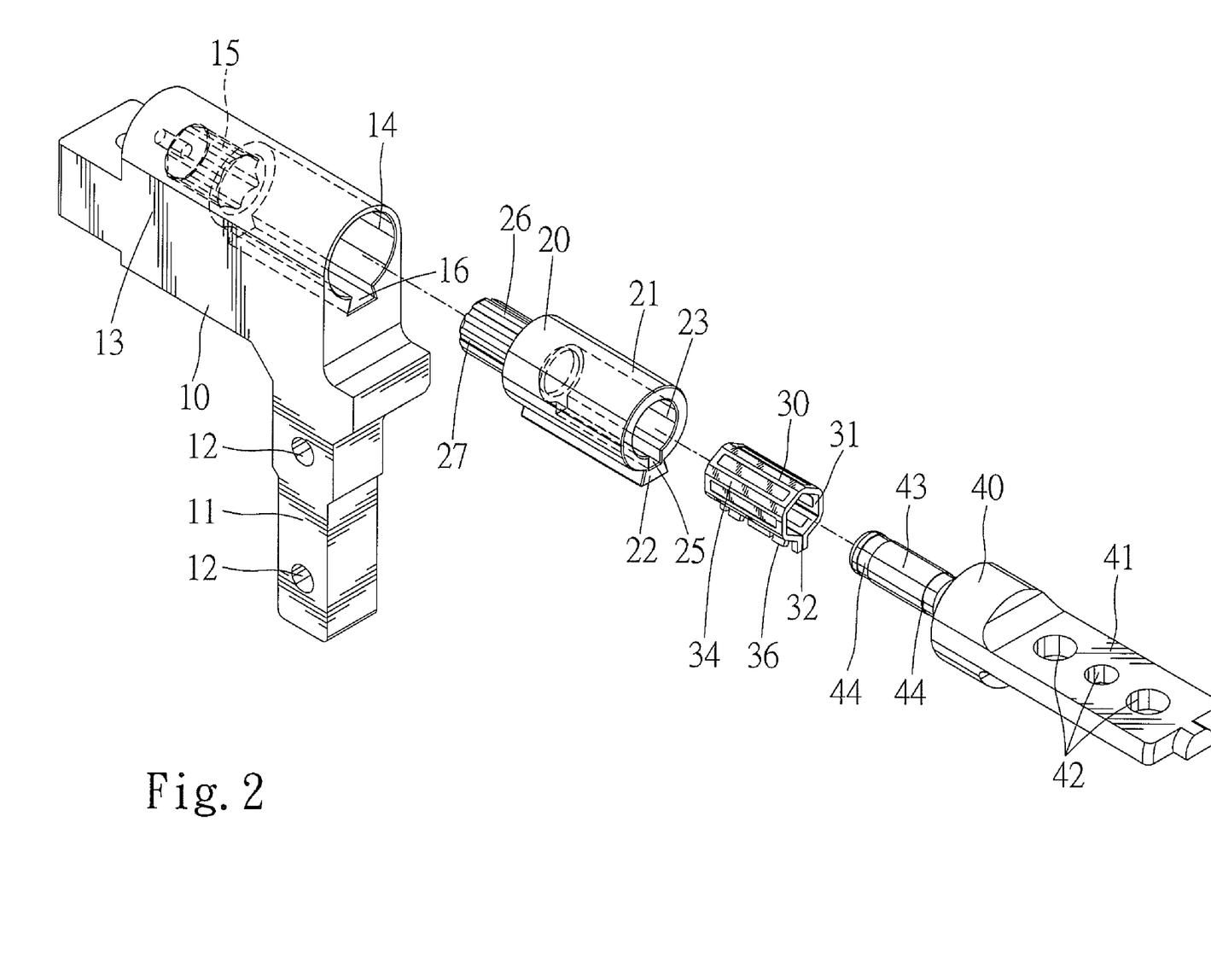
FIG. 2 is an exploded view of the hinge shown in FIG. 1.
Figure 3:
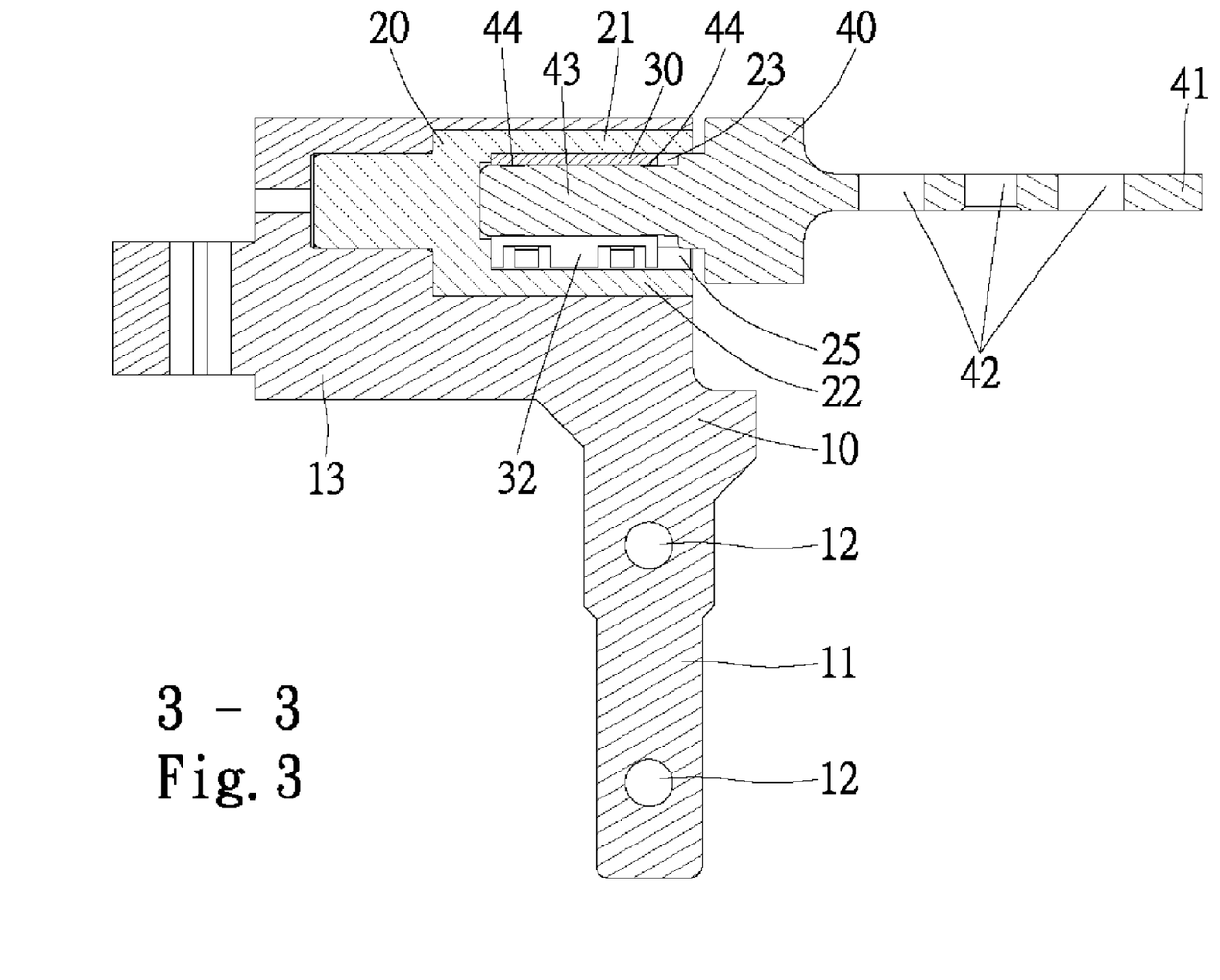
FIG. 3 is a cross-sectional view of the hinge taken along a line 3-3 shown in FIG. 1.

Referring to FIGS. 1 through 3, there is shown a hinge according to the preferred embodiment of the present invention. The hinge can be used in a laptop computer 50 including a host 51 and a liquid crystal display ("LCD") 52 as shown in FIGS. 4 through 8. The hinge includes a first connector 10, a lining 20, a bush 30 and a second connector 40.

The first connector 10 includes a root 11 and a socket 13 transversely extended from the root 11. The root 11 defines two apertures 12 through which fasteners can be driven into the host 51 for connecting the root 11 to the host 51. The socket 13 defines a first space 14, a second space 15 in communication with the first space 14 and a dovetail groove 16 in communication with the first space 14. The first space 14 is of a circular form when it is viewed in the axial direction. The second space 15 is of a non-circular form when it is viewed in a longitudinal direction. The second space 15 is smaller than the first space 14.

The lining 20 includes a tube 21, an insert 26 axially extended from the tube 21 and a dovetail 22 formed on the tube 21. The tube 21 defines a space 23 and a groove 25 in communication with the space 23. The space 23 includes a closed end. The external side of the tube 21 is complementary to the wall of the first space 14 of the socket 13. The insert 26 is of a non-circular form complementary to that of the second space 15 of the socket 13. The insert 26 defines, in the periphery, a plurality of grooves 27. The lining 20 is made by powder metallurgy.

The bush 30 includes a sleeve 31 and a positioning device formed on the sleeve 31. A metal strip is rolled into the sleeve 31, with two edges made into the positioning device. The positioning device includes pairs of tabs 32 and pairs of tabs 36. The tabs 32 extend parallel to each other. The tabs 36 are in contact with each other at an end but separated from each other at another end. The external side of the bush 30 is of a substantially polygonal form with corners 34 when it is viewed in the axial direction. The corners 34 are rounded for contact with the wall of the space 23 of the tube 21.

The second connector 40 includes a plate 41 and a shaft 43 axially extended from the plate 41. The plate 41 defines three apertures 42 through which fasteners can be driven into the LCD 52 for connecting the plate 41 to the LCD 52. The shaft 43 defines two annular grooves 44 for receiving damping oil.

Figure 7:
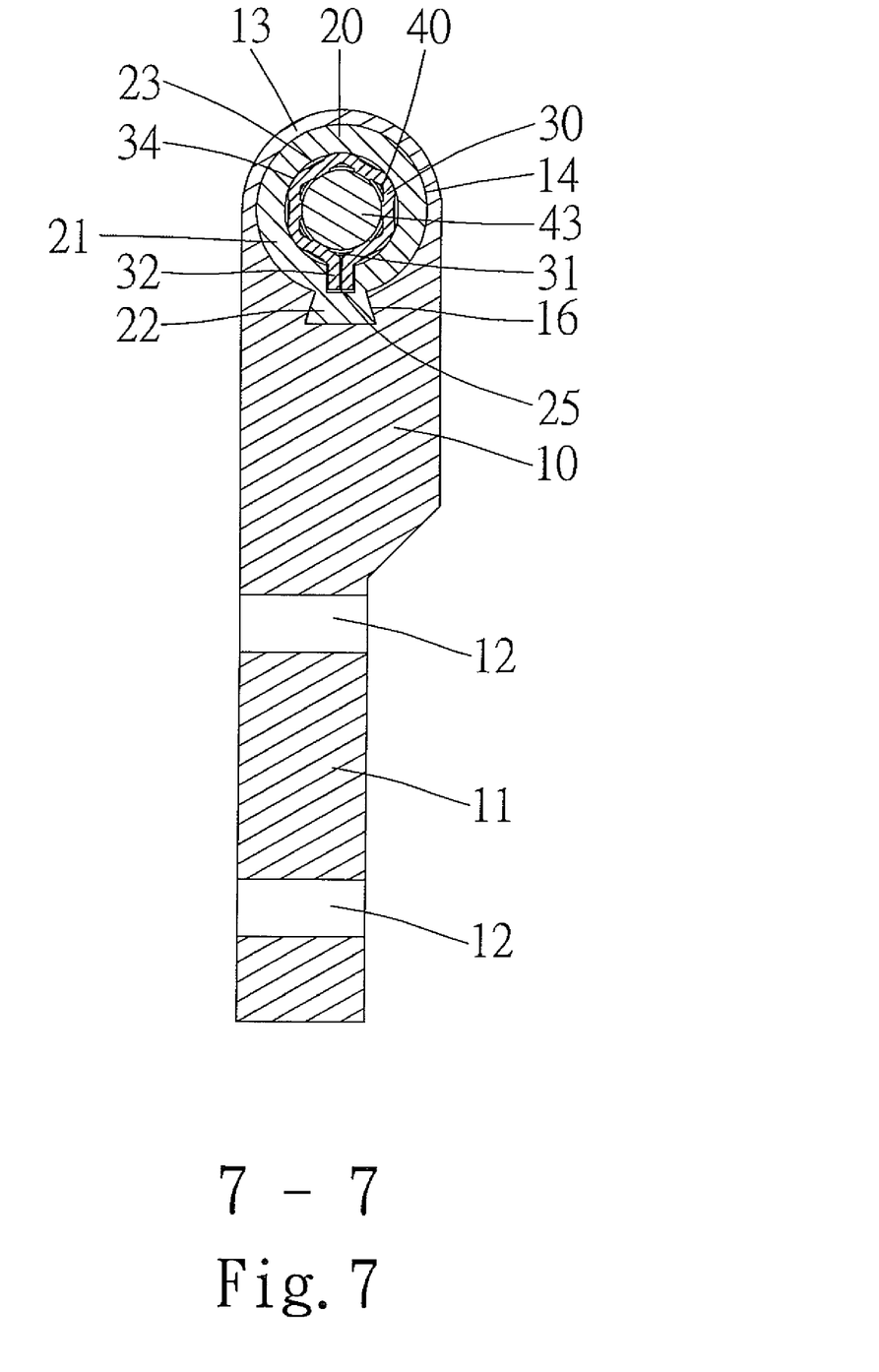
FIG. 7 is a cross-sectional view of the hinge taken along a line 7-7 shown in FIG. 1.
Figure 8:
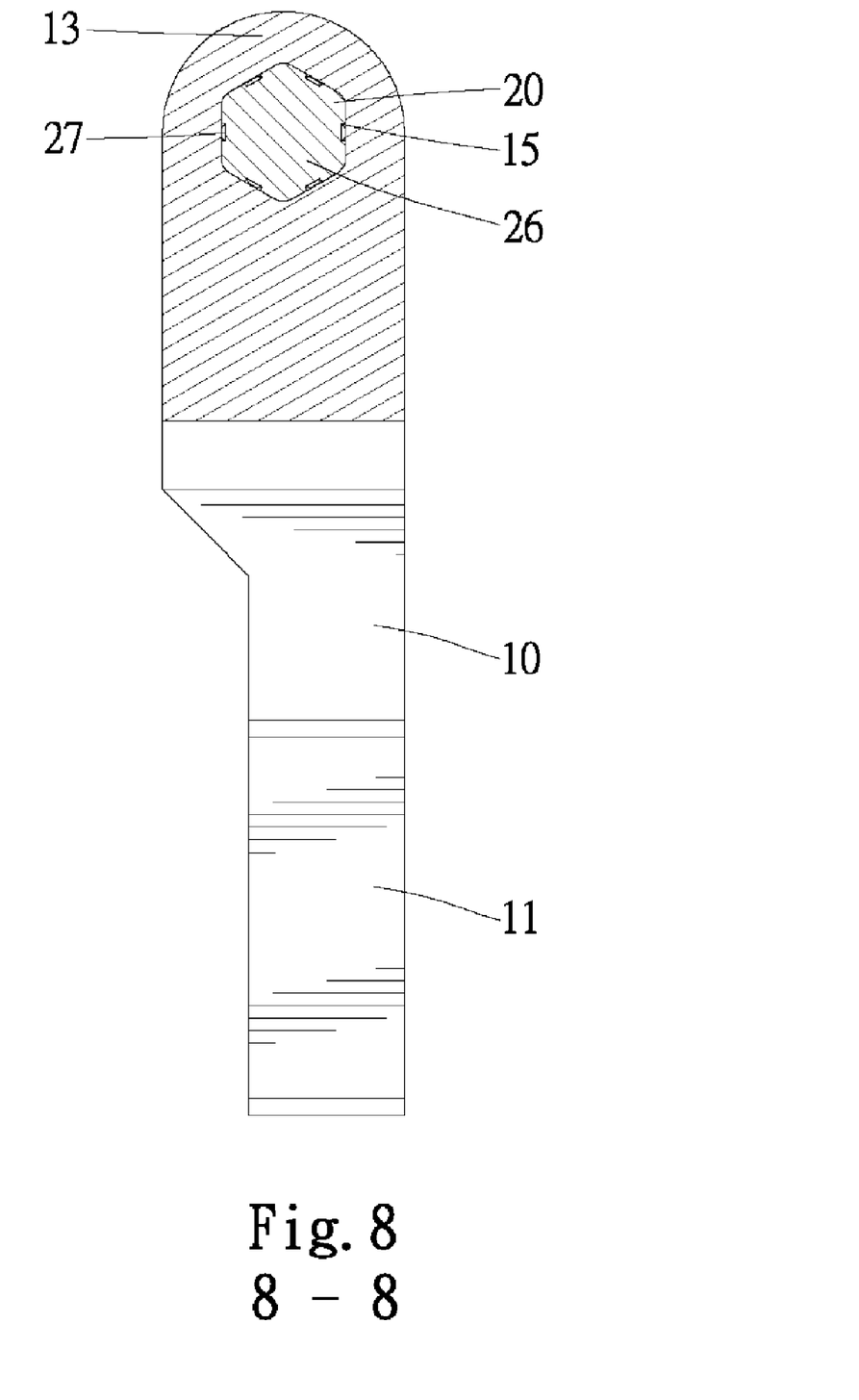
FIG. 8 is a cross-sectional view of the hinge taken along a line 8-8 shown in FIG. 1.

Referring to FIGS. 3 and 8, the insert 26 is fit in the second space 15 of the socket 13. The grooves 27 reduce the area of contact between the insert 26 and the wall of the second space 15 of the socket 13 so that the insert 26 can easily be inserted into the second space 15 of the socket 13. Referring to FIGS. 3 and 7, the tube 21 is inserted in the first space 14 of the socket 13, and the dovetail 22 is inserted in the dovetail groove 16 of the socket 13. Thus, the lining 20 is disposed non-rotationally in the socket 13. The rounded corners 34 are in contact with the wall of the space 23. The shaft 43 is rotationally disposed in and wrapped by the sleeve 31. The damping oil is provided between the shaft 43 and the sleeve 31 for damping the rotation. A free end of the shaft 43 is in contact with the closed end of the space 23.

Figure 4:
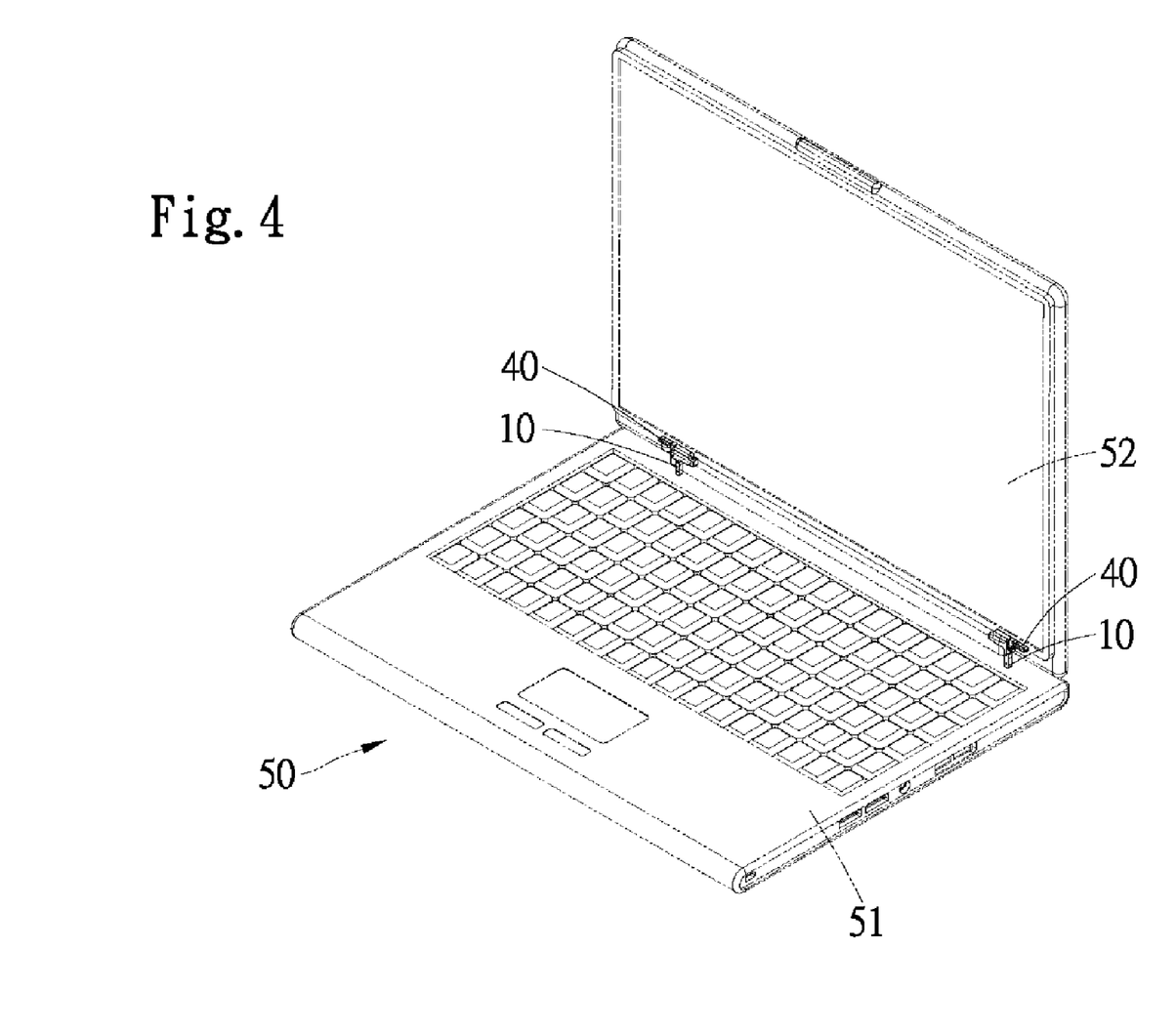
FIG. 4 is a perspective view of an open laptop computer equipped with two hinges as shown in FIG. 3.

Referring to FIGS. 3 and 4, the LCD 52 is pivoted from the host 51. That is, the laptop computer 50 is open. The laptop computer 50 can be kept in any desired open position due to the use of the hinge.

Figure 5:
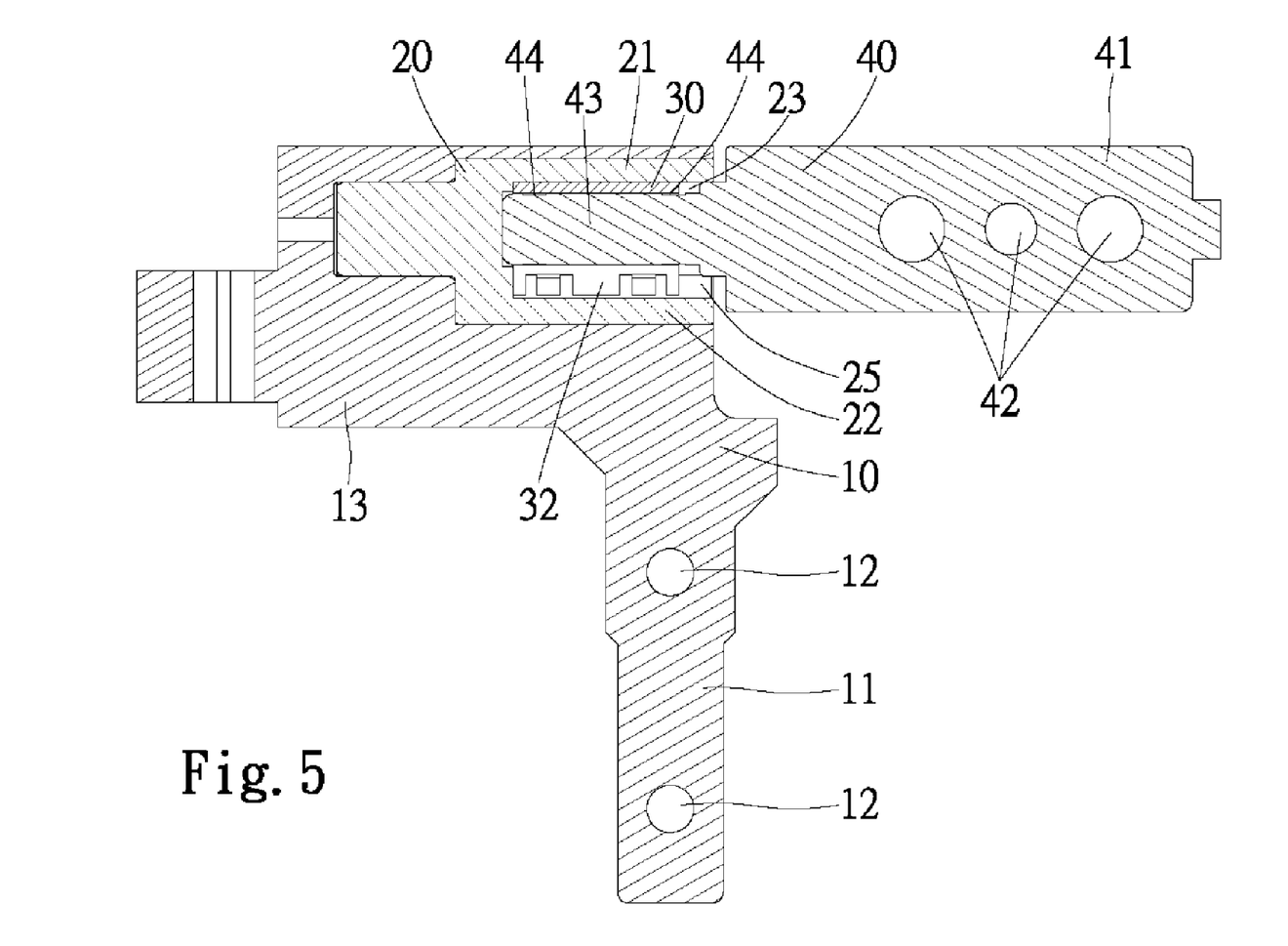
FIG. 5 is a cross-sectional view of the hinge in another position than shown in FIG. 3.
Figure 6:
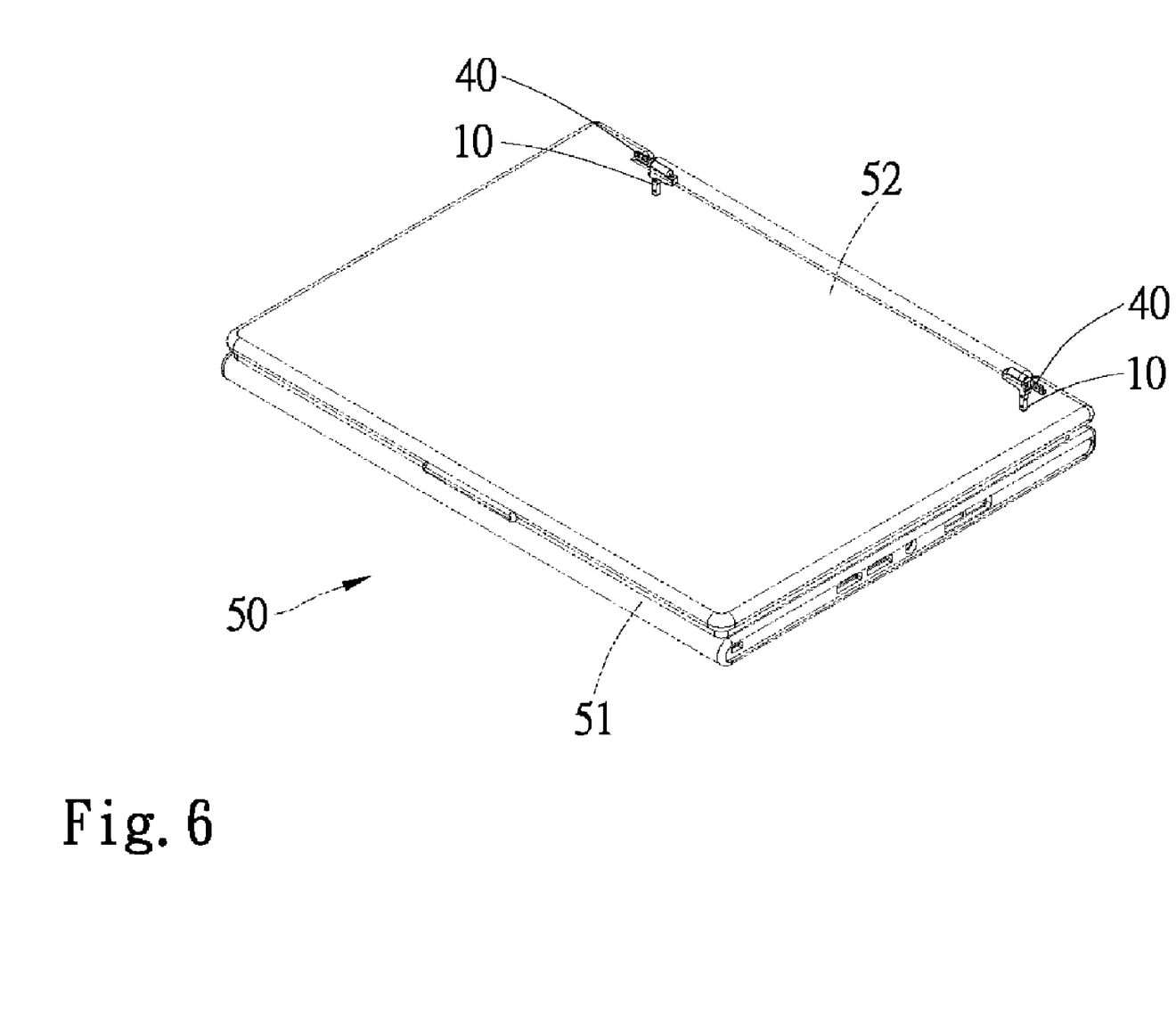
FIG. 6 is a perspective view of the laptop computer in a closed position where the hinges are in the position shown in FIG. 5.

Referring to FIGS. 5 and 6, the LCD 52 is pivoted to the host 51. In other words, the laptop computer 50 is closed.

The hinge of the present invention exhibits at least three advantages. Firstly, there is proper friction between the bush 30 and the shaft 43. Secondly, it is durable, since the bush 30 is robust and reinforced by the lining 20. Thirdly, the lining 20 can be made fast by powder metallurgy.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A hinge for use in a laptop computer, the hinge comprising:
    a first connector comprising a root for connection to a portion of a laptop computer and a socket extended from the root;
    a lining non-rotationally disposed in the socket;
    a bush non-rotationally disposed in the lining; and
    a second connector comprising a shaft rotationally inserted in the bush and a plate extended from the shaft for connection to another portion of the laptop computer,
    wherein the socket defines a first space and a second space in communication with the first space, wherein the lining comprises a tube inserted in the first space of the socket and an insert inserted in the second space of the socket, and wherein the second space of the socket is non-circular, and the insert is non-circular complementary to the second space of the socket.

2. A hinge for use in a laptop computer, the hinge comprising:
    a first connector comprising a root for connection to a portion of a laptop computer and a socket extended from the root;
    a lining non-rotationally disposed in the socket;
    a bush non-rotationally disposed in the lining; and
    a second connector comprising a shaft rotationally inserted in the bush and a plate extended from the shaft for connection to another portion of the laptop computer, and
    wherein the socket defines a first space and a second space in communication with the first space, wherein the lining comprises a tube inserted in the first space of the socket and an insert inserted in the second space of the socket, and wherein the socket defines a groove in communication with the first space, and the tube is formed with a ridge inserted in the groove.

3. The hinge according to claim 2 wherein the groove is a dovetail groove, and the ridge is a dovetail fit in the dovetail groove.

4. A hinge for use in a laptop computer, the hinge comprising:
    a first connector comprising a root for connection to a portion of a laptop computer and a socket extended from the root;
    a lining non-rotationally disposed in the socket;
    a bush non-rotationally disposed in the lining; and
    a second connector comprising a shaft rotationally inserted in the bush and a plate extended from the shaft for connection to another portion of the laptop computer, wherein the socket defines a first space, and the lining comprises a tube inserted in the first space of the socket, and wherein the tube defines a space and a groove in communication with the space, and the bush comprises a sleeve inserted in the space and a positioning device inserted in the groove.

5. The hinge according to claim 4 wherein the positioning device comprises at least one pair of parallel tabs.

6. The hinge according to claim 4 wherein the positioning device comprises at least one pair of diverged tabs.

7. The hinge according to claim 4 wherein the positioning device comprises at least one pair of parallel tabs and at least one pair of diverged tabs.

8. The hinge according to claim 4 wherein the shaft defines at least one annular groove for containing damping oil.

9. The hinge according to claim 8 wherein the shaft defines two annular grooves.

10. The hinge according to claim 4 wherein the lining is manufactured by powder metallurgy.

11. A hinge for use in a laptop computer, the hinge comprising:
    a first connector comprising a root for connection to a portion of a laptop computer and a socket extended from the root;
    a lining non-rotationally disposed in the socket;
    a bush non-rotationally disposed in the lining; and
    a second connector comprising a shaft rotationally inserted in the bush and a plate extended from the shaft for connection to another portion of the laptop computer, wherein the socket defines a first space, and the lining comprises a tube inserted in the first space of the socket, wherein the tube defines a space, wherein the bush comprises a sleeve inserted in the space, and wherein the sleeve comprises rounded corners in contact with an internal side of the lining.

* * * * *